Jan. 1, 1935. M. MITCHELL 1,986,738
ARTIFICIAL BAIT AND FISHING LURE OF THE SPINNER TYPE
Filed Dec. 15, 1933
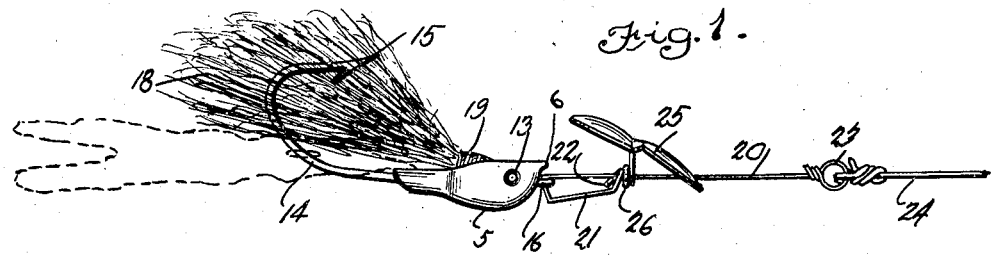
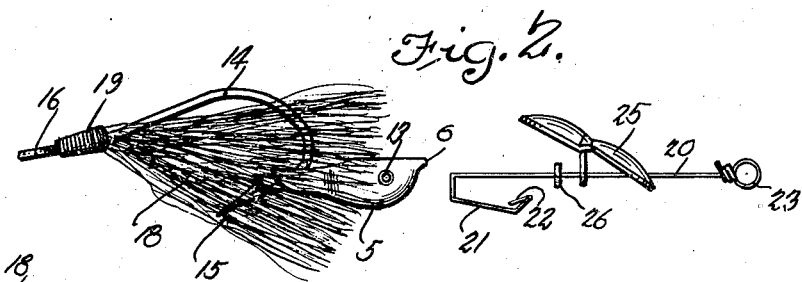
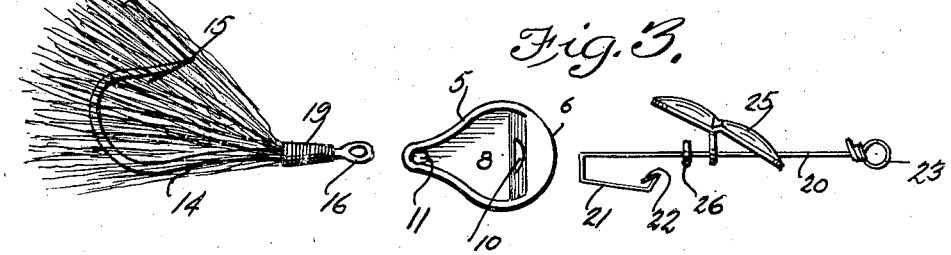
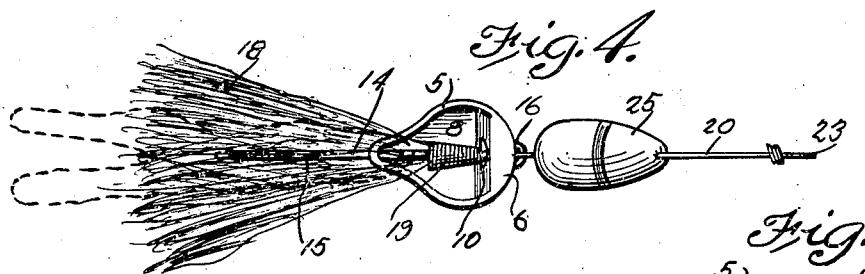
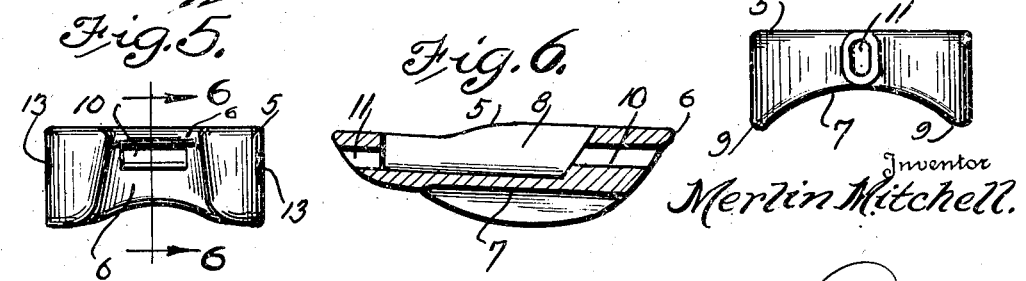
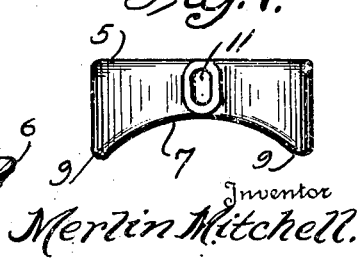
Inventor
Merlin Mitchell
By
D. Bryant,
Attorney.

Patented Jan. 1, 1935

1,986,738

UNITED STATES PATENT OFFICE 1,986,738

ARTIFICIAL BAIT AND FISHING LURE OF THE SPINNER TYPE

Merlin Mitchell, Orlando, Fla.

Application December 15, 1933, Serial No. 702,569

5 Claims. (Cl. 43—42)

This invention relates to improvements in artificial bait and fishing lure of the spinner type.

The primary object of this invention is to provide an exceedingly simple and comparatively inexpensive detachable weight adapted to be secured to the fish hook of the artificial lure in order to provide the necessary weight desirable for casting and which is exceedingly effective and convenient.

Another object of this invention is to provide a weight of the above mentioned character adapted to be readily attached and detached from the fish hook in order that the weight may be transferred from one hook to another as desired.

A still further object of this invention is to provide a weight of the above mentioned character constructed and arranged so that the weight will not become lost during use or when a fish is on the hook.

A still further object of this invention is to provide a weight in which the hook is passed through the weight and attached directly to the spinner wire or line which in turn makes the initial strike of the fish more sensitive to the fisherman whereby this direct attachment will have a tendency to maintain a direct tight line on the fish and prevent the fish from throwing the hook or lure.

A still further object of this invention is to provide a weight of the above mentioned character constructed in such a manner as to cause the point of the hook to ride upright at all times, which is very desirable due to the fact that the same will escape the weeds and other objects in the water and which may allow the use of the hook and artificial bait in water where there are weeds thereby gaining better results as it is well known that fish center around weeds and other objects in water.

A still further object of this invention is to provide a device of the above mentioned character including a detachable weight having a wide slot in the front portion thereof in order to allow a sideway movement of the eye of the hook caused by the kick of the spinner. This is an advantageous feature of the lure allowing a smaller spinner to be used due to the fact that the hook only is allowed movement and in effect the weight runs true and on an even keel. This feature is also considered advantageous in that it allows the hair that is attached to the hook to receive the motion transmitted by the spinner, effecting a life-like and oscillatory motion to the lure.

Other objects and advantages of the invention will become apparent during the course of the following description, taken with the drawing, wherein, Figure 1 is a side elevational view of the artificial lure embodying this invention;

Figure 2 is a side elevational view of the same illustrating the manner in which the parts may be detached for the removal of the weight;

Figure 3 is an exploded view of the artificial lure illustrating the shape and arrangement of the weight and its curved front wall through which is projected the eye of the hook as shown in Figure 1;

Figure 4 is a top elevational view of the fish lure illustrating the manner in which the weight is secured to the fish hook and showing the manner in which the same is retained in place by means of the spinner wire;

Figure 5 is a front elevational view of the weight illustrating the curved bottom wall forming parallel opposite keels and showing the slotted front wall for the reception of the looped portion of the fish hook;

Figure 6 is a longitudinal cross-sectional view taken on line 6—6 of Figure 5, looking in the direction of the arrows illustrating the contour of the weight and further showing the opposite parallel keels; and Figure 7 is a rear elevational view of the weight showing the slot for receiving the fish hook and again illustrating the curved bottom wall forming parallel opposed keels.

In the drawing wherein for the purpose of illustration and wherein like reference characters will be employed to designate like parts throughout the same, the reference character 5 will generally be employed to designate a weight which is pear-shaped and is provided with a curved front wall 6 and a curved bottom wall 7. The weight is hollowed as at 8 and tapers rearwardly. The curved wall 7 forms opposite parallel keels 9 and opening into the hollowed portion 8 are slots or passageways 10 and 11. The opening 10 is formed as shown in Figure 5 and is somewhat elongated being preferably formed centrally within the curved portion 6 while the opening 11 is also elongated at right angles to the opening or slot 10.

Markings 13 may be provided on the side walls of the pear-shaped weight 5 to represent eyes of a fish or the like by drilling openings with a countersink drill and afterwards coloring to produce the desired effect.

The weight above described is adapted to be threaded upon a fish hook 14 having a hooked end 15 and a looped end 16. For the purpose of assembly, the hook 15 is presented within the hollowed portion 8 of the weight so that the end may be passed through the elongated opening 11 as shown in Figure 2. Secured to the hook is the usual hair 18 held in place by wrappings 19.

After the end 15 of the hook has been projected through the opening 11 the end 16 is brought into alignment with the opening 10 and projected therethrough so that the loop 16 will extend therethrough and into the curved wall 6 whereupon the spinner wire 20 may have its looped end 21 passed through the fish hook loop 16 and then the free end of the loop is return-bent as at 22 over the spinner link or wire 20. The opposite end of the spinner wire 20 is provided with a loop 23 to which may be attached a fish line of suitable size 24. A spinner 25 is mounted on the spinner wire 20 for rotation and the usual bead 26 is provided for reducing the friction of the spinner 25.

It will readily be observed that the looped portion 16 of the fish hook 14 may be capable of sidewise movement while the rear or hooked end 15 of the fish hook 14 may be capable of a vertical movement. Due to the rotation of the spinner 25, vibration will be transmitted to the hook and cause a wobbling movement of the same and to the hair 18 while the weight 5 will travel in a true line on an even keel.

It is to be understood that the form of the invention herewith shown and described is to be taken as the preferred embodiment of the same and that various changes in the shape, size and arrangement of parts may be resorted to without departing from the spirit of the invention or the scope of the sub-joined claims.

I claim:—

1. An artificial fish lure comprising a pear shaped weight in plan, said weight having a horizontal slot formed in the front wall adapted to receive a fish hook capable of wobbling sideways in a horizontal fashion, said weight also being provided with a vertical slot formed in the rear whereby the fish hook may wobble in a vertical fashion and means for securing the weight to a fish hook and line.

2. An artificial fish lure comprising a pear-shaped weight in plan having a horizontal slot in the front wall thereof, said weight also having a vertical slot in the rear portion, a fish hook adapted to be threaded through said openings and a pair of keels formed on the bottom of the weight.

3. An artificial fish lure comprising a pear shaped weight in plan, a pair of keels formed on the bottom of the weight causing a low center of gravity, slots formed in the front and rear walls of the weight at right angles to each other and means for connecting the weight to a fishing tackle.

4. An artificial fishing lure comprising a body having a horizontal slot in the front portion thereof and a vertical slot in the rear portion, a fish hook adapted to be threaded through said slots, the barbed end of the fish hook being located rearwardly of the rear vertical slot and the forward end of the hook being located forwardly of the forward horizontal slot and the forward end of the hook being adapted to have a spinner wire, ring, line or the like attached thereto, the body slots providing a loose connection between the body and hook.

5. An artificial fishing lure comprising a body having slots formed in the front and rear portions at right angles to each other, a pair of parallel longitudinally extending keels on the bottom of the body, the bottom of the body between the keels being transversely concaved to dispose the bulk of the weight in the spaced parallel keels and means for connecting the body to a spinner wire or the like.

MERLIN MITCHELL.